(12) United States Patent
Pelin

(10) Patent No.: US 11,448,090 B2
(45) Date of Patent: Sep. 20, 2022

(54) FAN TRACK LINER

(71) Applicant: Rolls-Royce plc, London (GB)

(72) Inventor: Ricardo Pelin, London (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 17/147,910

(22) Filed: Jan. 13, 2021

(65) Prior Publication Data

US 2021/0404346 A1 Dec. 30, 2021

Related U.S. Application Data

(63) Continuation of application No. PCT/EP2019/067853, filed on Jul. 3, 2019.

(30) Foreign Application Priority Data

Jul. 13, 2018 (GB) .................................. 1811549

(51) Int. Cl.
*F01D 21/04* (2006.01)
*B33Y 80/00* (2015.01)
(Continued)

(52) U.S. Cl.
CPC ............ *F01D 21/045* (2013.01); *B29C 63/34* (2013.01); *B29C 64/118* (2017.08); *B29C 70/323* (2013.01); *B29D 24/005* (2013.01); *B29D 99/006* (2013.01); *B33Y 10/00* (2014.12); *B33Y 30/00* (2014.12); *B33Y 80/00* (2014.12); *F01D 25/005* (2013.01); *F01D 25/24* (2013.01); *B29L 2031/7504* (2013.01); *F05D 2220/36* (2013.01);
(Continued)

(58) Field of Classification Search
CPC . F01D 21/045; F04D 29/526; B23B 2571/02; F41H 1/00–08
See application file for complete search history.

(56) References Cited

U.S. PATENT DOCUMENTS 5,160,248 A 11/1992 Clarke
5,343,796 A * 9/1994 Cordova ............... F41H 5/0485
89/36.02
(Continued)

FOREIGN PATENT DOCUMENTS

EP 2070689 A2 6/2009
EP 2096269 A2 9/2009
(Continued)

OTHER PUBLICATIONS

Matsuzaki, R. et al. Three-dimensional printing of continuous-fiber composites by in-nozzle impregnation. Sci. Rep. 6, 23058; doi: 10.1038/srep23058 (2016). (Year: 2016).*
(Continued)

*Primary Examiner* — Topaz L. Elliott
(74) *Attorney, Agent, or Firm* — Banner & Witcoff, Ltd.

(57) ABSTRACT

A fan track liner for a fan containment arrangement for a gas turbine includes a cellular impact structure and a supporting sub-laminate integrally formed with each other from fibre-reinforced material. The fan track liner further includes a ballistic barrier comprising a woven reinforcing fibre ply and a layer of reinforcing fibre felt. There is also disclosed an associated fan containment arrangement and a method of manufacturing a fan track liner.

12 Claims, 8 Drawing Sheets

(51) Int. Cl.
| | |
|---|---|
| *F01D 25/24* | (2006.01) |
| *B33Y 10/00* | (2015.01) |
| *B33Y 30/00* | (2015.01) |
| *B29C 64/118* | (2017.01) |
| *B29C 63/34* | (2006.01) |
| *B29C 70/32* | (2006.01) |
| *B29D 24/00* | (2006.01) |
| *B29D 99/00* | (2010.01) |
| *F01D 25/00* | (2006.01) |
| *B29L 31/00* | (2006.01) |

(52) U.S. Cl.
CPC ...... *F05D 2230/31* (2013.01); *F05D 2240/14* (2013.01); *F05D 2250/283* (2013.01); *F05D 2300/603* (2013.01); *F05D 2300/6034* (2013.01); *F05D 2300/612* (2013.01)

(56) References Cited

U.S. PATENT DOCUMENTS

| | | | |
|---|---|---|---|
| 5,344,280 A | 9/1994 | Langenbrunner et al. | |
| 6,979,172 B1 | 12/2005 | Mackenzie | |
| 8,047,764 B2* | 11/2011 | Launders | F01D 25/24 |
| | | | 415/9 |
| 10,035,330 B2* | 7/2018 | Fuerst | B32B 3/12 |
| 11,156,125 B2* | 10/2021 | Clowes | F02K 3/06 |
| 2006/0145009 A1* | 7/2006 | Shockey | F41H 7/00 |
| | | | 89/36.11 |
| 2006/0260293 A1* | 11/2006 | Launders | F01D 21/045 |
| | | | 60/226.1 |
| 2007/0280817 A1* | 12/2007 | Costa | D03D 1/0052 |
| | | | 415/9 |
| 2009/0110538 A1* | 4/2009 | Kostka | F01D 21/045 |
| | | | 415/9 |
| 2011/0076132 A1* | 3/2011 | Bottome | F01D 25/26 |
| | | | 415/9 |
| 2012/0321443 A1 | 12/2012 | Ravey et al. | |
| 2013/0216367 A1 | 8/2013 | Lussier et al. | |
| 2014/0161601 A1* | 6/2014 | Geiger | F01D 21/045 |
| | | | 415/213.1 |
| 2015/0139779 A1 | 5/2015 | Harper et al. | |
| 2015/0308290 A1 | 10/2015 | Kappes | |
| 2015/0345320 A1 | 12/2015 | Webb | |
| 2016/0169048 A1 | 6/2016 | Grainger | |
| 2017/0032828 A1 | 2/2017 | Kim et al. | |
| 2017/0167291 A1 | 6/2017 | Koroly | |
| 2017/0198716 A1* | 7/2017 | Crutchfield | F04D 29/526 |
| 2017/0198717 A1* | 7/2017 | Crutchfield | F01D 21/045 |
| 2017/0305117 A1* | 10/2017 | Fuerst | B32B 3/12 |
| 2018/0283205 A1* | 10/2018 | Fracchia | B64D 27/20 |
| 2019/0136871 A1* | 5/2019 | Cheung | B32B 9/047 |
| 2022/0025768 A1* | 1/2022 | Foster | F01D 9/02 |

FOREIGN PATENT DOCUMENTS

| | | | | |
|---|---|---|---|---|
| EP | 2829687 A1 * | 1/2015 | ......... | F01D 21/045 |
| EP | 2952696 A1 | 12/2015 | | |

OTHER PUBLICATIONS

Jan. 15, 2019—(GB) Search Report—App. No. 1811549.3.
Dec. 6, 2019—(WO) International Search Report & Written Opinion—App. No. PCT/EP2019/067853.

* cited by examiner

FAN TRACK LINER

CROSS-REFERENCE TO RELATED APPLICATIONS

This application is a continuation of co-pending International Application No. PCT/EP2019/067853, filed Jul. 3, 2019, which claims the benefit of priority to United Kingdom Application No. GB 1811549.3, filed Jul. 13, 2018, and the present application claims the benefit of the filing date of both of these prior applications, which are incorporated by reference in their entireties.

FIELD

The present disclosure concerns fan track liners and methods of manufacturing fan track liners.

BACKGROUND

Gas turbine engines include a fan having fan blades in front of the engine. The fan may be contained in a fan containment casing. In a failure event during operation, one of the fan blades may break off from the fan and impact the fan containment casing. This is generally referred to as a fan blade-off (FBO) event. After a turbine engine fan loses a blade, the loads on the fan containment casing rise well above those experienced in normal flight conditions because of the fan impact. During engine shut down, which is typically about a few seconds, cracks can propagate rapidly in the fan containment casing from the damage caused by the impact of the FBO, which may lead to containment failure.

A fan track liner is typically provided on an inboard surface of the fan containment casing. Fan track liners may include one or more layers of cellular material, such as aluminium honeycomb or foam, which may be sandwiched between and bonded to supporting fibre-reinforced laminate layers. Fan track liners are designed to absorb some of the energy of an impacting blade during an FBO event.

The manufacture of fan containment arrangements comprising fan track liners bonded to fan containment casings can be complex and time-consuming. It has also been observed that composite fan track liners have a tendency to deform structurally on curing, for example, when being bonded to fan containment casings. Indeed, shrinkage of fan track liners on final curing of a fan containment arrangement can also cause structural distortions of the surrounding fan containment casing.

SUMMARY OF INVENTION

According to a first aspect, there is provided a fan track liner for a fan containment arrangement for a gas turbine engine, the fan track liner comprising a cellular impact structure and a supporting sub-laminate integrally formed with each other from a fibre-reinforced polymer material.

Because the cellular impact structure and the supporting sub-laminate are integrally formed with one another from fibre-reinforced polymer material, the thermal behaviour of the cellular impact structure (i.e. the behaviour of the cellular impact structure in response to heating and/or cooling) may be substantially the same as the thermal behaviour of the supporting sub-laminate. For example, it may be that the cellular impact structure and the supporting sub-laminate expand or contract relatively uniformly on heating or cooling. It may be that the coefficient of thermal expansion of the (i.e. material forming the) cellular impact structure is similar to, for example, the same as, the coefficient of thermal expansion of the (i.e. material forming the) supporting sub-laminate. It may be that the coefficient of thermal expansion is substantially uniform throughout the cellular impact structure and the supporting sub-laminate. For example, it may be that the coefficient of thermal expansion of the cellular impact structure is no more than 10% greater than, for example no more than 5% greater than, or no more than 3% greater than, or no more than 1% greater than, and no less than 10% lower than, for example no less than 5% lower than, or no less than 3% lower than, or no less than 1% lower than, the coefficient of thermal expansion of the supporting sub-laminate. Consequently, structural distortions of the fan track liner on heating or cooling (for example, during curing cycles) may be reduced, for example, minimised.

The cellular impact structure may be a honeycomb structure. The honeycomb structure may comprise a plurality of cells formed between cell walls. The cells may be substantially hollow. The honeycomb structure may be described as a network of connected cell walls at least partially enclosing a plurality of cells, for example, substantially hollow cells. The cell walls may be thin relative to the cell dimensions. For example, the cell walls may have a thickness no greater than 10%, for example, no greater than 5%, or no greater than 1%, of a characteristic cell dimension, for example, a cell width. The cell walls may also be thin relative to a thickness of the cellular impact structure. The cells may be arranged regularly on a lattice. The cells may be columnar. The cells may be columnar and arranged substantially parallel to one another, i.e. such that the longitudinal axis of each columnar cell is substantially parallel to the longitudinal axis of each other columnar cell.

The honeycomb structure may be a hexagonal honeycomb structure. The honeycomb structure may comprise columnar cells which are hexagonal in cross-section. The honeycomb structure may be an expanded honeycomb structure (i.e. an "over-expanded" honeycomb structure), a reinforced hexagonal honeycomb structure (i.e. a primarily hexagonal honeycomb structure reinforced by additional cell walls), or a rectangular honeycomb structure. The honeycomb structure may comprise a periodic repeating pattern of cell walls. The repeating pattern may be regular. The repeating pattern may be hierarchical. The repeating pattern may form cells having two or more, or three or more, or four or more, different cell shapes.

The cellular impact structure may have a density of no greater than about 200 kg/m$^3$, for example, no greater than about 180 kg/m$^3$, or no greater than about 160 kg/m$^3$, or no greater than about 150 kg/m$^3$. The cellular impact structure may have a density of no less than about 10 kg/m$^3$, for example, no less than about 25 kg/m$^3$, or no less than about 50 kg/m$^3$. The cellular impact structure may have a density of from about 10 kg/m$^3$ to about 200 kg/m$^3$, for example, from about 25 kg/m$^3$ to about 180 kg/m$^3$, or from about 50 kg/m$^3$ to about 160 kg/m$^3$, or from about 50 kg/m$^3$ to about 150 kg/m$^3$.

A relative density, R, of the cellular impact structure may be defined as $$R = \frac{\rho^*}{\rho}$$

wherein $\rho^*$ is the density of the cellular impact structure and $\rho$ is the density of the solid material (i.e. fibre-reinforced polymer material) from which the cellular impact structure (i.e. the cellular impact structure walls) is formed. The cellular impact structure may have a relative density, R, of no greater than about 0.5, for example, no greater than about 0.4, or no greater than about 0.3, or no greater than about 0.2.

It may be that the cellular impact structure has an average cell diameter (i.e. cell size) of no greater than about 20 mm, for example, no greater than about 15 mm, or no greater than about 10 mm, or no greater than about 7 mm. It may be that the cellular impact structure has an average cell diameter of no less than about 0.1 mm, for example, no less than about 1 mm, or no less than about 2 mm, or no less than about 3 mm. It may be that the cellular impact structure has an average cell diameter of from about 0.1 mm to about 20 mm, for example from about 1 mm to about 15 mm, or from about 1 mm to about 10 mm, or from about 3 mm to about 10 mm.

For a cellular impact structure having a honeycomb structure having columnar cell walls, a maximum in-plane cell diameter may be defined as the maximum straight line distance between opposing cell walls measured in cross-section through the cell perpendicular to the cell walls. For a cellular impact structure having a honeycomb structure having columnar cell walls, a minimum in-plane cell diameter may be defined as the minimum straight line distance between opposing cell walls measured in cross-section through the cell perpendicular to the cell walls.

It may be that the cellular impact structure has a maximum in-plane cell diameter of no greater than about 20 mm, for example, no greater than about 15 mm, or no greater than about 10 mm, or no greater than about 7 mm. It may be that the cellular impact structure has a maximum in-plane cell diameter of no less than about 0.1 mm, for example, no less than about 1 mm, or no less than about 2 mm, or no less than about 3 mm. It may be that the cellular impact structure has a maximum in-plane cell diameter of from about 0.1 mm to about 20 mm, for example from about 1 mm to about 15 mm, or from about 1 mm to about 10 mm, or from about 3 mm to about 10 mm.

It may be that the cellular impact structure has a minimum in-plane cell diameter of no greater than about 20 mm, for example, no greater than about 15 mm, or no greater than about 10 mm, or no greater than about 7 mm. It may be that the cellular impact structure has a minimum in-plane cell diameter of no less than about 0.1 mm, for example, no less than about 1 mm, or no less than about 2 mm, or no less than about 3 mm. It may be that the cellular impact structure has a minimum in-plane cell diameter of from about 0.1 mm to about 20 mm, for example from about 1 mm to about 15 mm, or from about 1 mm to about 10 mm, or from about 5 mm to about 10 mm.

The cellular impact structure may comprise substantially hollow cells. It may be that the majority (for example, all) of the cells in the cellular impact structure are substantially hollow.

It may be that some, for example, the majority (e.g., all), of the cells in the cellular impact structure are filled with gas. For example, it may be that some, for example, the majority (e.g., all), of the cells in the cellular impact structure are filled with air. It may be that at least some, for example, the majority, or substantially all, of the cells of the cellular impact structure are gas-filled cells, for example, air-filled cells.

The supporting sub-laminate may be solid. The supporting sub-laminate may be a solid layer of fibre-reinforced polymer material. The supporting sub-laminate may be a monolithic slab of solid fibre-reinforced polymer material.

The supporting sub-laminate may comprise a substantially two-dimensional (e.g. planar) arrangement of reinforcing fibres. It will be understood that, although the fan track liner is typically curved (e.g. annular or cylindrical) in shape, locally a two-dimensional plane may be defined (i.e. tangentially) in which the reinforcing fibres are arranged. For example, the reinforcing fibres may be arranged axially along the fan track liner or around a circumference of the fan track liner or along directions intermediate said axial or circumferential orientations. However, reinforcing fibres are not typically aligned along radial directions or directions having substantial radial components.

The supporting sub-laminate may be substantially unidirectional, i.e. the reinforcing fibres in the supporting sub-laminate may be oriented predominantly in the same direction. Alternatively, the supporting sub-laminate may be multiaxial, i.e. the reinforcing fibres in the supporting sub-laminate may be arranged in two or more layers having different fibre orientations. For example, the supporting sub-laminate may comprise first and second layers, wherein, in the first layer, reinforcing fibres are oriented predominantly in a first direction, and wherein, in the second layer, reinforcing fibres are oriented in a second direction which is different from the first direction.

The fan track liner may comprise a ballistic barrier. The ballistic barrier may be configured to slow down an impacting projectile (such as an impacting fan blade during an FBO event) and to reduce the likelihood of the impacting projectile penetrating a surrounding fan containment casing in use.

The ballistic barrier may comprise one or more reinforcing fibre plies.

The ballistic barrier may comprise a woven reinforcing fibre ply. It will be appreciated that a woven reinforcing fibre ply is a fabric ply woven from reinforcing fibres by the interlacing of warp and weft reinforcing fibres in a repeating pattern. The woven reinforcing fibre ply may have one or more of the following weaves: plain, twill, satin, basket, leno, mock leno. The woven reinforcing fibre ply may provide the ballistic barrier with strength.

The ballistic barrier may comprise a layer of reinforcing fibre felt. It will be appreciated that a reinforcing fibre felt is a textile formed from randomly oriented and/or matted reinforcing fibres. The reinforcing fibre felt may be formed from continuous or discontinuous (e.g. long or chopped) reinforcing fibres. The layer of reinforcing fibre felt may improve the ability of the ballistic barrier to absorb energy on impact of a projectile. The layer of reinforcing fibre felt may also form a softening blanket around sharp edges of an impacting projectile, effectively blunting those sharp edges.

The ballistic barrier may comprise both a woven reinforcing fibre ply and a layer of reinforcing fibre felt. The layer of reinforcing fibre felt may be provided inboard of the woven reinforcing fibre ply. The woven reinforcing fibre ply and the layer of reinforcing fibre felt may be in direct contact with one another. Alternatively, the woven reinforcing fibre ply and the layer of reinforcing fibre felt may be spaced apart from one another. An air gap may be provided between the woven reinforcing fibre ply and the layer of reinforcing fibre felt. On impact of a projectile such as a fan blade, the layer of reinforcing fibre felt may absorb impact energy and soften sharp edges of the impacting projectile, slowing the projectile down and reducing the likelihood of the projectile penetrating the woven reinforcing fibre ply.

The ballistic barrier may comprise more than one woven reinforcing fibre ply. The ballistic barrier may comprise more than one layer of reinforcing fibre felt. The fan track liner may comprise more than one ballistic barrier.

The ballistic barrier may be embedded within the fan track liner. The ballistic barrier, or at least the layer of reinforcing fibre felt, may be entirely encapsulated by surrounding material. Encapsulation of the ballistic barrier, and in particular the layer of reinforcing fibre felt, may reduce absorption of moisture by the layer of reinforcing fibre felt.

The cellular impact structure and the supporting sub-laminate may be integrally formed with each other by additive manufacture. It will be appreciated that the term "additive manufacture" refers to the computer-controlled deposition of materials to build up a three-dimensional component structure and can be contrasted with "subtractive manufacturing" in which material is sequentially removed by machining to arrive at the desired component structure. Additive manufacture may sometimes be referred to as "3D printing".

Additive manufacture encompasses the method known as "fused deposition modelling" (FDM) or "fused filament fabrication" (FFF) in which a component is manufactured by additively applying material in layers, typically by feeding plastic or metal filament through an extruder head to deposit molten material onto a substrate. Accordingly, the cellular impact structure and the supporting sub-laminate may be integrally formed with each other by fused deposition modelling or fused filament fabrication.

The cellular impact structure and the supporting sub-laminate may be integrally formed with each other by additive manufacture (e.g. FDM or FFF) such that the material forming the cellular impact structure is continuous with the material forming the supporting sub-laminate.

The cellular impact structure and the supporting sub-laminate may be integrally formed with each other by additive manufacture (e.g. FDM or FFF) such that there is no discernible interface (for example, on inspection of a cross-section cut through the fan track liner) between the cellular impact structure and the supporting sub-laminate.

The cellular impact structure and the supporting sub-laminate may be integrally formed with each other by additive manufacture (e.g. FDM or FFF) such that reinforcing fibres extend between the cellular impact structure and the supporting sub-laminate.

It will be appreciated that a fibre-reinforced polymer material typically comprises reinforcing fibres suspended in a polymer matrix material.

The polymer matrix material may be a thermoplastic polymer (i.e. a thermoplastic). Alternatively, the polymer matrix material may be a thermosetting polymer (i.e. a thermoset).

The polymer matrix material may comprise (e.g. consist of) one or more of the following: epoxy (i.e. epoxy resin), polyester, vinyl ester, polyamide (e.g. aliphatic or semi-aromatic polyamides, for example, nylon), polylactide, polycarbonate, acrylonitrile butadiene styrene, polyether ether ketone (PEEK), polyetherimide (PEI).

The fibre-reinforced polymer material may comprise carbon reinforcing fibres. The fibre-reinforced polymer material may be carbon fibre reinforced polymer (CFRP).

The fibre-reinforced polymer material may comprise aramid (i.e. aromatic polyamide) reinforcing fibres. The fibre-reinforced polymer material may comprise para-aramid reinforcing fibres. For example, the fibre-reinforced polymer material may comprise reinforcing fibres formed from poly-paraphenylene terephthalamide (Kevlar®) or p-phenylene terephthalamide (Twaron®).

The fibre-reinforced polymer material may comprise reinforcing fibres formed from a thermoset liquid-crystalline polyoxazole. For example, the fibre-reinforced polymer material may comprise reinforcing fibres formed from poly (p-phenylene-2,6-benzobisoxazole) (PBO or Zylon®).

The fibre-reinforced polymer material may comprise reinforcing fibres formed from polyethylene, for example, ultra-high-molecular-weight polyethylene (UHMWPE). UHMWPE may have a molecular mass from about 3.5 million amu to about 7.5 million amu.

Accordingly, it may be that the fibre-reinforced polymer material comprises reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The fibre-reinforced polymer material may comprise continuous reinforcing fibres. The fibre-reinforced polymer material may comprise discontinuous (e.g. chopped) reinforcing fibres.

The cellular impact structure and the supporting sub-laminate may be integrally formed with each other (e.g. additively manufactured together) from the same fibre-reinforced polymer material.

The cellular impact structure and the supporting sub-laminate may be integrally formed with each other (e.g. additively manufactured together) from the same fibre-reinforced polymer material such that the thermal expansion coefficient of the cellular impact structure and thermal expansion coefficient of the supporting sub-laminate are substantially the same. For example, it may be that the thermal expansion coefficient varies by no greater than 10%, for example, no greater than 5%, or no greater than 3%, or no greater than 1%, throughout the cellular impact structure and the supporting sub-laminate. It may be that the thermal expansion coefficient varies by no greater than 10%, for example, no greater than 5%, or no greater than 3%, or no greater than 1%, throughout the fan track liner.

The woven reinforcing fibre ply may comprise (e.g. be woven from) reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The reinforcing fibre felt may comprise reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The fan track liner may comprise two or more of said cellular impact structures. Each cellular impact structure may be separated from each other cellular impact structure by a corresponding septum layer. Each septum layer may be formed by a supporting sub-laminate. One or more septum layers (e.g. each septum layer) may comprise a ballistic barrier. One or more septum layers (e.g. each septum layer) may be formed by a ballistic barrier.

It may be that some or each of the cellular impact structures have different cell densities. It may be that some or each of the cellular impact structures have different cell geometries.

For example, the fan track liner may comprise two cellular impact structures. The fan track liner may comprise two cellular impact structures separated from one another by a septum layer. The septum layer may be formed by a supporting sub-laminate. The septum layer may comprise a ballistic barrier. The septum layer may be formed by a ballistic barrier.

It may be that the two cellular impact structures have different cell densities. It may be that the two cellular impact structures comprise an outboard cellular impact structure and an inboard cellular impact structure, wherein the cell density of the outboard cellular impact structure is lower than the cell density of the inboard cellular impact structure.

It may be that the two cellular impact structures have different cell geometries. It may be that one or both of the cellular impact structures is an optimised-angle cellular impact structure. It may be that the outboard cellular impact structure is an optimised-angle cellular impact structure. It may be that cell walls of the optimised-angle cellular impact structure are arranged to align with the projected path of a fan blade during an FBO event.

It may be that both of the two cellular impact structures have honeycomb structures. It may be that the outboard cellular impact structure has an optimised-angle honeycomb structure.

The fan track liner may comprise a supporting face-sheet sub-laminate. The supporting face-sheet sub-laminate may form an inboard face of the fan track liner. The supporting face-sheet sub-laminate may form an outboard face of the fan track liner. The supporting face-sheet sub-laminate may be integrally formed (e.g. additively manufactured) with the cellular impact structure and/or the supporting sub-laminate from the fibre-reinforced polymer material. The supporting face-sheet sub-laminate may be the supporting sub-laminate integrally formed with the cellular impact structure from the fibre-reinforced polymer material.

The fan track liner may comprise two supporting face-sheet sub-laminates. One of the two supporting face-sheet sub-laminates may form an inboard face of the fan track liner. The other of the two supporting face-sheet sub-laminates may form an outboard face of the fan track liner. The two supporting face-sheet sub-laminates may together form a sandwich structure in which the cellular impact structure is located between the two supporting face-sheet sub-laminates. The two supporting face-sheet sub-laminates may be integrally formed (e.g. additively manufactured) with the cellular impact structure and/or the supporting sub-laminate from the fibre-reinforced polymer material. One of the two supporting face-sheet sub-laminates may be the supporting sub-laminate integrally formed with the cellular impact structure from the fibre-reinforced polymer material. For example, the fan track liner may comprise the cellular impact structure, the supporting sub-laminate which is a first supporting face-sheet sub-laminate, and another supporting sub-laminate which is a second supporting face-sheet sub-laminate, the first and second supporting face-sheet sub-laminates forming a sandwich structure in which the cellular impact structure is located between the first and second supporting face-sheet sub-laminates, wherein the cellular impact structure, the first supporting face-sheet sub-laminate and the second supporting face-sheet sub-laminate are integrally formed with one another (e.g. additively manufactured together) from the fibre-reinforced polymer material.

The fan track liner may further comprise an abradable structure. The abradable structure may be located on an inboard-most face of the fan track liner. The abradable structure may be located on an inboard-most supporting face-sheet sub-laminate. The abradable structure may be configured to be abraded by the movement of fan blades during operation of the jet engine, to provide a close fit between the fan containment arrangement and the fan blades and to minimise air leakage around the fan blade tips. The abradable structure made have a cellular structure, i.e. the abradable structure may be a cellular abradable structure. The cellular abradable structure may have a foam structure. The cellular abradable structure may have honeycomb structure. The cellular abradable structure may be integrally formed with (e.g. additively manufactured together with) the cellular impact structure and/or the supporting sub-laminate and/or one of the supporting face-sheet sub-laminates from the fibre-reinforced polymer material.

It may be that the majority of the fan track liner is formed from the (i.e. same) fibre-reinforced polymer material. It may be that at least 50%, for example, at least 60%, or at least 70%, or at least 80%, or at least 90%, or at least 95%, of the mass of the fan track liner consists of the (i.e. same) fibre-reinforced polymer material. It may be that at least 50%, for example, at least 60%, or at least 70%, or at least 80%, or at least 90%, or at least 95%, of the material volume of the fan track liner consists of the (i.e. same) fibre-reinforced polymer material.

It may be that the entire fan track liner is formed from the (i.e. same) fibre-reinforced polymer material. Alternatively, it may be that the entire fan track liner, except for the ballistic barrier, is formed from the (i.e. the same) fibre-reinforced polymer material.

The fan containment arrangement may comprise a fan containment casing and the fan track liner. The fan containment casing may be configured to provide structural support for the fan track liner.

The fan track liner may function in use as a fan impact liner, i.e. the fan track liner may be a fan impact liner. The fan containment arrangement may further comprise a sound suppression liner. The sound suppression liner may be provided forward or aft of the fan track liner (i.e. the fan impact liner). The fan containment arrangement may comprise two sound suppression liners, one sound suppression liner being provided forward of the fan track liner (i.e. the fan impact liner) and the other sound suppression liner being provided aft of the fan track liner (i.e. the fan impact liner).

The or each sound suppression liner may be formed from the fibre-reinforced polymer material, for example, by additive manufacture. The or each sound suppression liner may be integrally formed with the fan track liner (i.e. the fan impact liner) from the fibre-reinforced polymer material, for example, by additive manufacture. The or each sound suppression liner may comprise a cellular resonance structure and one or more supporting sub-laminates integrally formed with each other from the fibre-reinforced polymer material, for example, by additive manufacture. The cellular resonance structure may have a honeycomb structure.

According to a second aspect, there is provided a fan containment arrangement for a gas turbine engine, the fan containment arrangement comprising a fan containment casing and a fan track liner according to the first aspect of the invention.

The fan containment casing may be configured to provide structural support for the fan track liner.

The fan track liner may be provided on an inboard surface of the fan containment casing. The fan track liner may be mounted on the inboard surface of the fan containment casing. The fan track liner may be adhered to or bonded to the inboard surface of the fan containment casing. The fan track liner may be integrally formed with the fan containment casing, e.g. integrally formed with the fan containment casing on an inboard side.

The fan track liner may function in use as a fan impact liner in the fan containment arrangement, i.e. the fan track liner may be a fan impact liner. The fan containment arrangement may further comprise a sound suppression liner. The sound suppression liner may be provided forward or aft of the fan track liner (i.e. the fan impact liner). The fan containment arrangement may comprise two sound suppression liners, one sound suppression liner being provided forward of the fan track liner (i.e. the fan impact liner) and the other sound suppression liner being provided aft of the fan track liner (i.e. the fan impact liner).

The or each sound suppression liner may be formed from the fibre-reinforced polymer material, for example, by additive manufacture. The or each sound suppression liner may be integrally formed with the fan track liner (i.e. the fan impact liner) from the fibre-reinforced polymer material, for example, by additive manufacture. The or each sound suppression liner may comprise a cellular resonance structure and one or more supporting sub-laminates integrally formed with each other from the fibre-reinforced polymer material, for example, by additive manufacture. The cellular resonance structure may have a honeycomb structure.

The fan containment casing may include, along an axial extent thereof, a forward portion, a middle portion and an aft portion. The axial extent of the fan containment casing may correspond to the axial location of a fan when the fan containment casing is installed in a gas turbine engine. The forward portion and the aft portion may be thinner than the middle portion. Each of the forward portion and the aft portion may be reduced in thickness with distance away from the middle portion. The fan track liner may be provided on the inboard surface of the fan containment casing in the middle portion. The fan track liner may be selectively located on the inboard surface of the fan containment casing at a portion of the fan containment casing configured to surround the fan. The fan track liner may selectively be located in a projected path of a fan blade during an FBO event. The fan track liner may selectively be located on the inboard surface of the fan containment casing at an impact region, i.e. at least one impact region most likely to be impacted by a fan blade during an FBO event.

According to a third aspect, there is provided a method of manufacturing a fan track liner or a fan track liner preform for a fan containment arrangement for a gas turbine engine, the method comprising: depositing, by additive manufacturing apparatus, fibre-reinforced polymer material to form a cellular impact structure and a supporting sub-laminate integrated with one another. The method may be a method of manufacturing a fan track liner according to the first aspect and/or a method of manufacturing a fan track liner preform for a fan track liner according to the first aspect.

The method may comprise depositing, by additive manufacturing apparatus, fibre-reinforced polymer material to form more than one cellular impact structure, for example, two cellular impact structures. The method may comprise depositing, by additive manufacturing apparatus, fibre-reinforced polymer material to form more than one supporting sub-laminate. The method may comprise depositing, by additive manufacturing apparatus, fibre-reinforced polymer material to form one or more supporting face-sheet sub-laminates, for example, two supporting face-sheet sub-laminates. The method may comprise depositing, by additive manufacturing apparatus, fibre-reinforced polymer material to form one or more septum layers between cellular impact structures. The method may comprise depositing, by additive manufacturing apparatus, fibre-reinforced polymer material to form an abradable structure, for example, a cellular abradable structure.

The use of additive manufacturing apparatus significantly reduces the manufacturing time required to produce the fan track liner, particularly in comparison to the most common method of manufacturing a fan track liner which involves separately forming the individual component layers of the fan track liner followed by assembling the component layers and bonding them together to form the fan track liner.

Additive manufacturing apparatus encompasses fused deposition modelling (FDM) or fused filament fabrication (FFF) apparatus. FDM or FFF apparatus may comprise an extruder head. The extruder head may be heated. FDM or FFF apparatus may comprise means for feeding one or more filaments of material into and through the extruder head, for example, a motor configured to draw one or more filaments of material into and through the extruder head. Heat and pressure applied to the one or more filaments of material passing through the extruder head may cause at least a portion of the material to transition to a liquid state, thereby allowing controlled deposition of molten material onto a substrate.

In order to deposit fibre-reinforced polymer material, it may be that the additive manufacturing apparatus (e.g. FDM or FFF apparatus) receives fibre-reinforced polymer material as an input. Fibre-reinforced polymer material may be prepared, for example, by compounding reinforcing fibres and polymer (for example, in the form of polymer pellets) in a mixer and by extruding the resultant mixture to form a filament of fibre-reinforced polymer material suitable for use in e.g. FDM or FFF apparatus. In such embodiments, the filament of fibre-reinforced polymer material received by the additive manufacturing apparatus and/or the fibre-reinforced polymer material deposited by the additive manufacturing apparatus may comprise discontinuous (e.g. chopped) reinforcing fibres.

Alternatively, it may be that the additive manufacturing apparatus (e.g. FDM or FFF apparatus) receives reinforcing fibres and polymer as separate inputs. For example, the additive manufacturing apparatus may receive a polymer filament and a reinforcing fibre filament (e.g. a continuous reinforcing fibre filament). It may be that heating of the polymer filament and the reinforcing fibre filament together within the extruder head of the additive manufacturing apparatus causes impregnation of the reinforcing fibre filament with polymer. In such embodiments, the fibre-reinforced polymer material deposited by the additive manufacturing apparatus may comprise discontinuous or continuous reinforcing fibres. A similar method may be used to deposit fibre-reinforced polymer material comprising reinforcing fibre yarns. An example of a method permitting additive manufacture with continuous fibre-reinforced polymer material can be found in "*Three-dimensional printing of continuous fiber composites by in-nozzle impregnation*", R. Matsuzaki et al., *Scientific Reports 6, Article number:* 23058 (2016), which is hereby incorporated by reference in its entirety. Such methods may also provide control over the orientation of deposited reinforcing fibres.

In a further alternative, it may be that the additive manufacturing apparatus (e.g. FDM or FFF apparatus) receives a filament comprising continuous reinforcing fibre embedded in polymer, for example, a polymer-coated continuous reinforcing fibre filament, as a single input.

The fibre-reinforced polymer material deposited may comprise a thermoplastic polymer (i.e. a thermoplastic) matrix material. Alternatively, the fibre-reinforced polymer material deposited may comprise a thermosetting polymer (i.e. a thermoset) matrix material. The additive manufacturing apparatus may receive thermoplastic polymer or thermosetting polymer as an input.

The matrix material may comprise (e.g. consist of) one or more of the following: epoxy (i.e. epoxy resin), polyester, vinyl ester, polyamide (e.g. aliphatic or semi-aromatic polyamides, for example, nylon), polylactide, polycarbonate, acrylonitrile butadiene styrene, polyether ether ketone (PEEK), polyetherimide (PEI) The additive manufacturing apparatus may receive one or more of the following, for example, filaments comprising one or more of the following, as inputs: epoxy (i.e. epoxy resin), polyester, vinyl ester, polyamide (e.g. aliphatic or semi-aromatic polyamides, for example, nylon), polylactide, polycarbonate, acrylonitrile butadiene styrene, polyether ether ketone (PEEK), polyetherimide (PEI)

The fibre-reinforced polymer material may comprise carbon reinforcing fibres. The fibre-reinforced polymer material may be carbon fibre reinforced polymer (CFRP).

The fibre-reinforced polymer material may comprise aramid (i.e. aromatic polyamide) reinforcing fibres. The fibre-reinforced polymer material may comprise para-aramid reinforcing fibres. For example, the fibre-reinforced polymer material may comprise reinforcing fibres formed from poly-paraphenylene terephthalamide (Kevlar®) or p-phenylene terephthalamide (Twaron®).

The fibre-reinforced polymer material may comprise reinforcing fibres formed from a thermoset liquid-crystalline polyoxazole. For example, the fibre-reinforced polymer material may comprise reinforcing fibres formed from poly (p-phenylene-2,6-benzobisoxazole) (PBO or Zylon®).

The fibre-reinforced polymer material may comprise reinforcing fibres formed from polyethylene, for example, ultra-high-molecular-weight polyethylene (UHMWPE). UHMWPE may have a molecular mass from about 3.5 million amu to about 7.5 million amu.

Accordingly, it may be that the fibre-reinforced polymer material comprises reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)). The additive manufacturing apparatus may receive reinforcing fibres of one or more of the following, for example, filaments comprising reinforcing fibres of one or more of the following, as inputs: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The fibre-reinforced polymer material may comprise continuous reinforcing fibres. The fibre-reinforced polymer material may comprise discontinuous (e.g. chopped) reinforcing fibres. The additive manufacturing apparatus may receive continuous reinforcing fibres as inputs. The additive manufacturing apparatus may receive discontinuous (e.g. chopped) reinforcing fibres as inputs. The additive manufacturing apparatus may receive reinforcing fibre yarns as inputs.

The method may comprise depositing the fibre-reinforced polymer material to form a cellular impact structure and a supporting sub-laminate in the same continuous process.

The method may comprise depositing the same fibre-reinforced polymer material to form the cellular impact structure and the supporting sub-laminate (and/or any of the more than one cellular impact structures, the more than one supporting sub-laminates, the one or more supporting facesheet sub-laminates, the one or more septum layers, or the abradable structure). Depositing the same fibre-reinforced polymer material to form said structures may simplify and speed up the manufacturing process. Depositing the same fibre-reinforced polymer material to form said structures may also result in the coefficient of thermal expansion being effectively uniform throughout most, for example, all, of the layers of the fan track liner. Consequently, the fan track liner may expand or contract uniformly in response to changes in temperature, resulting in a reduction in, for example, minimisation of, structural distortions of the fan track liner during any curing or bonding processes. Where any structural distortions still remain, these are generally more predictable and the modelling of the thermal response of the fan track liner is generally simplified.

The method may comprise providing or producing a digital model for the fan track liner or the fan track liner preform. The digital model may be provided in the form of a Computer-aided Design (CAD) file such as an Additive Manufacturing File (AMF) or a stereolithography (STL) file.

The method may comprise controlling the additive manufacturing apparatus using the digital model. The method may comprise controlling the additive manufacturing apparatus using the digital model to deposit fibre-reinforced polymer material to form the cellular impact structure and the supporting sub-laminate. For example, the method may comprise a controller controlling the additive manufacturing apparatus using the digital model to deposit fibre-reinforced polymer material to form the cellular impact structure and the supporting sub-laminate.

The controller may comprise a processor (in electronic communication with a memory storing computer executable program code) configured (e.g. programmed) to control the additive manufacturing apparatus using the digital model to deposit fibre-reinforced polymer material to form the cellular impact structure and the supporting sub-laminate.

The fan track liner formed by the method may be a fan impact liner. The method may comprise depositing, by additive manufacturing apparatus, fibre-reinforced polymer material to form a cellular resonance structure and one or more supporting sub-laminates integrally formed with each other to form a sound suppression liner. The cellular resonance structure may have a honeycomb structure. The method may comprise depositing, by additive manufacturing apparatus, fibre-reinforced polymer material to form the sound suppression liner integrally formed with the fan track liner (i.e. the fan impact liner). The method may comprise depositing, by additive manufacturing apparatus, fibre-reinforced polymer material to form more than one said sound suppression liner integrally formed with the fan track liner (i.e. the fan impact liner).

The or each sound suppression liner may be formed from the fibre-reinforced polymer material, for example, by additive manufacture. The or each sound suppression liner may be integrally formed with the fan track liner (i.e. the fan impact liner) from the fibre-reinforced polymer material, for example, by additive manufacture. The or each sound suppression liner may comprise a cellular resonance structure and one or more supporting sub-laminates integrally formed with each other from the fibre-reinforced polymer material, for example, by additive manufacture.

The method may comprise depositing the fibre-reinforced polymer material onto a tool. The method may comprise depositing the fibre-reinforced polymer material onto a mandrel. The mandrel may be rotatable. The method may comprise depositing the fibre-reinforced polymer material onto a rotating mandrel.

The additive manufacturing apparatus may comprise one or more extruder heads movably mounted on a gantry. The gantry may be positionable over the mandrel. The method may comprise: positioning the gantry over the mandrel; rotating the mandrel; and depositing fibre-reinforced polymer material (i.e. by way of the one or more extruder heads) onto the rotating mandrel to form the cellular impact structure and the supporting sub-laminate. In embodiments in which the fibre-reinforced polymer material comprises a thermosetting polymer, the method may further comprise curing the fibre-reinforced polymer material, for example, by application of heat and/or pressure (for example, in an autoclave).

Alternatively, the method may comprise depositing the fibre-reinforced polymer material onto an inboard surface of a fan containment casing or a fan containment casing preform. The method may comprise depositing the fibre-reinforced polymer material on an adhesive-coated inboard surface of the fan containment casing or the fan containment casing preform.

The additive manufacturing apparatus may comprise one or more extruder heads mounted on a movable arm. The method may comprise: positioning the arm inside the fan containment casing or the fan containment casing preform; and depositing fibre-reinforced polymer material (i.e. by way of the one or more extruder heads) onto the inboard surface of the fan containment casing or the fan containment casing preform. The method may comprise moving, for example, rotating, the fan containment casing or the fan containment casing preform about the arm during deposition. Alternatively, the method may comprise moving the arm around the interior of the fan containment casing or the fan containment casing preform during deposition.

According to a fourth aspect, there is provided a method of manufacturing a fan containment arrangement for a gas turbine engine, the method comprising: forming a fan track liner or a fan track liner preform on a rotating mandrel by the method according to the third aspect; laying up a fan containment casing preform around the fan track liner or fan track liner preform formed on the rotating mandrel; and curing the fan containment casing preform and, optionally, where present, curing the fan track liner preform.

For example, the method may comprise: forming a fan track liner on a rotating mandrel by the method according to the third aspect; laying up a fan containment casing preform around the fan track liner formed on the rotating mandrel; and curing the fan containment casing preform. Alternatively, the method may comprise: forming a fan track liner preform on a rotating mandrel by the method according to the third aspect; laying up a fan containment casing preform around the fan track liner preform formed on the rotating mandrel; and curing the fan containment casing preform and the fan track liner preform (e.g. at the same time).

By forming the fan containment casing around the fan track liner formed on the rotating mandrel, the overall manufacturing time required for manufacture of the fan containment arrangement may be reduced, particularly in comparison to the most commonly used method of forming a fan containment arrangement which involves assembling and bonding together the various layers of a fan track liner, laying up and curing the various layers of a fan containment casing, and bonding the fan track liner to the fan containment casing.

According to a fifth aspect, there is provided a method of a manufacturing a fan containment arrangement for a gas turbine engine, the method comprising: providing a fan containment casing or a fan containment casing preform; and forming a fan track liner or fan track liner preform on an inboard surface, for example, an adhesive-coated inboard surface, of the fan containment casing or the fan containment casing preform by the method according to the third aspect; and, optionally, where present, curing the fan track liner preform and/or the fan containment casing preform.

For example, the method may comprise: providing a fan containment casing; and forming a fan track liner on an inboard surface, for example, an adhesive-coated inboard surface, of the fan containment casing by the method according to the third aspect. Alternatively, the method may comprise: providing a fan containment casing; forming a fan track liner preform on an inboard surface, for example, an adhesive-coated inboard surface, of the fan containment casing by the method according to the third aspect; and curing the fan track liner preform. In a further alternative, the method may comprise: providing a fan containment casing preform; forming a fan track liner preform on an inboard surface, for example, an adhesive-coated inboard surface, of the fan containment casing preform by the method according to the third aspect; and curing the fan track liner preform and the fan containment casing preform.

By forming the fan track liner directly on the inboard surface of the fan containment casing or fan containment casing preform, the overall manufacturing time required for manufacture of the fan containment arrangement may be reduced, particularly in comparison to the most commonly used method of forming a fan containment arrangement which involves assembling and bonding together the various layers of a fan track liner, laying up and curing the various layers of a fan containment casing, and bonding the fan track liner to the fan containment casing.

According to a sixth aspect, there is provided a digital design model for the fan track liner according to the first aspect. The digital model may be provided in the form of a Computer-aided Design (CAD) file such as an Additive Manufacturing File (AMF) or a stereolithography (STL) file.

According to a seventh aspect, there is provided a non-transitory computer-readable medium storing the digital design model according to the sixth aspect.

According to an eighth aspect, there is provided a data carrier signal carrying the digital design model according to the sixth aspect.

According to a ninth aspect, there is provided a computer program comprising instructions to cause an additive manufacturing apparatus to carry out the method according to the third aspect and/or to produce a fan track liner according to the first aspect. For example, it may be that the additive manufacturing apparatus comprises or is in electronic communication with a computer (for example, a processor in a controller) and that the computer program comprises instructions which, when the program is executed by the computer (for example, by the processor), cause the additive manufacturing apparatus to carry out the method according to the third aspect and/or to produce a fan track liner according to the first aspect.

According to a tenth aspect, there is provided a non-transitory computer-readable medium storing the computer program according the ninth aspect.

According to an eleventh aspect, there is provided a data carrier signal carrying the computer program according to the ninth aspect.

According to a twelfth aspect, there is provided a fan track liner for a fan containment arrangement for a gas turbine engine, the fan track liner comprising an embedded ballistic barrier comprising a woven reinforcing fibre ply and a layer of reinforcing fibre felt.

The ballistic barrier may be configured to slow down an impacting projectile (such as an impacting fan blade during an FBO event) and to reduce the likelihood of the impacting projectile penetrating a surrounding fan containment casing in use.

It will be appreciated that a woven reinforcing fibre ply is a fabric ply woven from reinforcing fibres by the interlacing of warp and weft reinforcing fibres in a repeating pattern. The woven reinforcing fibre ply may have one or more of the following weaves: plain, twill, satin, basket, leno, mock leno. The woven reinforcing fibre ply may provide the ballistic barrier with strength.

It will also be appreciated that a reinforcing fibre felt is a textile formed from randomly oriented and/or matted reinforcing fibres. The reinforcing fibre felt may be formed from continuous or discontinuous (e.g. long or chopped) reinforcing fibres. The layer of reinforcing fibre felt may improve the ability of the ballistic barrier to absorb energy on impact of a projectile. The layer of reinforcing fibre felt may also form a softening blanket around sharp edges of an impacting projectile, effectively blunting those sharp edges.

The layer of reinforcing fibre felt may be provided inboard of the woven reinforcing fibre ply. The woven reinforcing fibre ply and the layer of reinforcing fibre felt may be in direct contact with one another. Alternatively, the woven reinforcing fibre ply and the layer of reinforcing fibre felt may be spaced apart from one another. An air gap may be provided between the woven reinforcing fibre ply and the layer of reinforcing fibre felt. On impact of a projectile such as a fan blade, the layer of reinforcing fibre felt may absorb impact energy and soften sharp edges of the impacting projectile, slowing the projectile down and reducing the likelihood of the projectile penetrating the woven reinforcing fibre ply.

The ballistic barrier may comprise more than one woven reinforcing fibre ply. The ballistic barrier may comprise more than one layer of reinforcing fibre felt. The fan track liner may comprise more than one ballistic barrier.

The fan track liner may comprise a supporting sub-laminate. The fan track liner may comprise more than one supporting sub-laminate.

The fan track liner may comprise a supporting face-sheet sub-laminate. The supporting face-sheet sub-laminate may form an inboard face of the fan track liner. The supporting face-sheet sub-laminate may form an outboard face of the fan track liner.

The fan track liner may comprise a cellular impact structure. The fan track liner may comprise two or more of cellular impact structures. Each cellular impact structure may be separated from each other cellular impact structure by a corresponding septum layer. Each septum layer may be formed by a supporting sub-laminate. One of the septum layers may comprise the ballistic barrier. One of the septum layers may be formed by the ballistic barrier.

For example, the fan track liner may comprise two cellular impact structures. The fan track liner may comprise two cellular impact structures separated from one another by a septum layer. The septum layer may be formed by a supporting sub-laminate. The septum layer may comprise the ballistic barrier. The septum layer may be formed by the ballistic barrier.

It may be that the two cellular impact structures have different cell densities. It may be that the two cellular impact structures comprise an outboard cellular impact structure and an inboard cellular impact structure, wherein the cell density of the outboard cellular impact structure is lower than the cell density of the inboard cellular impact structure.

It may be that the two cellular impact structures have different cell geometries. It may be that one or both of the cellular impact structures is an optimised-angle cellular impact structure. It may be that the outboard cellular impact structure is an optimised-angle cellular impact structure. It may be that cell walls of the optimised-angle cellular impact structure are arranged to align with the projected path of a fan blade during an FBO event.

It may be that both of the two cellular impact structures have honeycomb structures. It may be that one or both of the cellular impact structures has a honeycomb structure. It may be that the outboard cellular impact structure has an optimised-angle honeycomb structure.

The fan track liner may comprise two supporting face-sheet sub-laminates. One of the two supporting face-sheet sub-laminates may form an inboard face of the fan track liner. The other of the two supporting face-sheet sub-laminates may form an outboard face of the fan track liner. The two supporting face-sheet sub-laminates may together form a sandwich structure in which the cellular impact structure is located between the two supporting face-sheet sub-laminates. The two supporting face-sheet sub-laminates may be integrally formed (e.g. additively manufactured) with the cellular impact structure and/or the supporting sub-laminate from the fibre-reinforced polymer material.

The fan track liner may further comprise an abradable structure. The abradable structure may be located on an inboard-most face of the fan track liner. The abradable structure may be located on an inboard-most supporting face-sheet sub-laminate. The abradable structure may be configured to be abraded by the movement of fan blades during operation of the jet engine, to provide a close fit between the fan containment arrangement and the fan blades and to minimise air leakage around the fan blade tips. The abradable structure made have a cellular structure, i.e. the abradable structure may be a cellular abradable structure. The cellular abradable structure may have a foam structure. The cellular abradable structure may have honeycomb structure. The cellular abradable structure may be integrally formed with (e.g. additively manufactured together with) the cellular impact structure and/or the supporting sub-laminate and/or one of the supporting face-sheet sub-laminates from the fibre-reinforced polymer material.

The woven reinforcing fibre ply may comprise (e.g. be woven from) reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The reinforcing fibre felt may comprise reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

It may be that the woven reinforcing fibre ply and the layer of reinforcing fibre felt each comprise reinforcing fibres made from one or more of the following: carbon, aramid polymers (e.g. para-aramid polymers such as poly-paraphenylene terephthalamide or p-phenylene terephthalamide), ultra-high-molecular-weight polyethylene, thermoset liquid-crystalline polyoxazoles (e.g. poly(p-phenylene-2,6-benzobisoxazole)).

The ballistic barrier, or at least the layer of reinforcing fibre felt, may be entirely encapsulated by surrounding material. Encapsulation of the ballistic barrier, and in particular the layer of reinforcing fibre felt, may reduce absorption of moisture by the layer of reinforcing fibre felt.

According to a thirteenth aspect, there is provided a fan containment arrangement for a gas turbine engine, the fan containment arrangement comprising a fan containment casing and a fan track liner according to the twelfth aspect. The fan containment casing may be configured to provide structural support for the fan track liner.

The fan track liner may be provided on an inboard surface of the fan containment casing. The fan track liner may be mounted on the inboard surface of the fan containment casing. The fan track liner may be adhered to or bonded to the inboard surface of the fan containment casing. The fan track liner may be integrally formed with the fan containment casing, e.g. integrally formed with the fan containment casing on an inboard side.

The fan track liner may function in use as a fan impact liner in the fan containment arrangement, i.e. the fan track liner may be a fan impact liner. The fan containment arrangement may further comprise a sound suppression liner. The sound suppression liner may be provided forward or aft of the fan track liner (i.e. the fan impact liner). The fan containment arrangement may comprise two sound suppression liners, one sound suppression liner being provided forward of the fan track liner (i.e. the fan impact liner) and the other sound suppression liner being provided aft of the fan track liner (i.e. the fan impact liner).

The or each sound suppression liner may be formed from the fibre-reinforced polymer material, for example, by additive manufacture. The or each sound suppression liner may be integrally formed with the fan track liner (i.e. the fan impact liner) from the fibre-reinforced polymer material, for example, by additive manufacture. The or each sound suppression liner may comprise a cellular resonance structure and one or more supporting sub-laminates integrally formed with each other from the fibre-reinforced polymer material, for example, by additive manufacture.

The fan containment casing may include, along an axial extent thereof, a forward portion, a middle portion and an aft portion. The axial extent of the fan containment casing may correspond to the axial location of a fan when the fan containment casing is installed in a gas turbine engine. The forward portion and the aft portion may be thinner than the middle portion. Each of the forward portion and the aft portion may be reduced in thickness with distance away from the middle portion. The fan track liner may be provided on the inboard surface of the fan containment casing in the middle portion. The fan track liner may be selectively located on the inboard surface of the fan containment casing at a portion of the fan containment casing configured to surround the fan. The fan track liner may selectively be located in a projected path of a fan blade during an FBO event. The fan track liner may selectively be located on the inboard surface of the fan containment casing at an impact region, i.e. at least one impact region most likely to be impacted by a fan blade during an FBO event.

According to a fourteenth aspect, there is provided a method of manufacturing a fan track liner for a fan containment arrangement for a gas turbine engine, the method comprising: depositing, for example by additive manufacturing apparatus, fibre-reinforced polymer material to form a first portion of the fan track liner or a fan track liner preform; forming a ballistic barrier layer on the first portion of the fan track liner or fan track liner preform by applying a woven reinforcing fibre ply and a layer of reinforcing fibre felt; and depositing, for example by additive manufacturing apparatus, fibre-reinforced polymer material onto and around the ballistic barrier layer to form a second portion of the fan track liner or fan track liner preform, thereby encapsulating the ballistic barrier layer between the first and second portions of the fan track liner or fan track liner preform. The method may further comprise curing the fan track liner preform.

For example, the method may comprise: depositing, for example by additive manufacturing apparatus, fibre-reinforced polymer material to form a first portion of the fan track liner; forming a ballistic barrier layer on the first portion of the fan track liner by applying a woven reinforcing fibre ply and a layer of reinforcing fibre felt; and depositing, for example by additive manufacturing apparatus, fibre-reinforced polymer material onto and around the ballistic barrier layer to form a second portion of the fan track liner, thereby encapsulating the ballistic barrier layer between the first and second portions of the fan track liner. Alternatively, the method may comprise: depositing, for example by additive manufacturing apparatus, fibre-reinforced polymer material to form a first portion of the fan track liner preform; forming a ballistic barrier layer on the first portion of the fan track liner preform by applying a woven reinforcing fibre ply and a layer of reinforcing fibre felt; depositing, for example by additive manufacturing apparatus, fibre-reinforced polymer material onto and around the ballistic barrier layer to form a second portion of the fan track liner preform, thereby encapsulating the ballistic barrier layer between the first and second portions of the fan track liner preform; and curing the fan track liner preform.

Depositing fibre-reinforced polymer material to form the first or the second portions of the fan track liner or the fan track liner preform may comprise depositing, for example by additive manufacturing apparatus, fibre-reinforced polymer material to form one or more of the following: cellular impact structures, supporting sub-laminates, supporting face-sheet sub-laminates, septum layers, abradable structures.

The method may include use of additive manufacturing apparatus or methods or fibre-reinforced polymer materials (including constituent reinforcing fibres and polymer matrix materials) discussed herein in relation to any other aspect.

The woven reinforcing fibre ply and the layer of reinforcing fibre felt are not typically additively manufactured.

Applying the woven reinforcing fibre ply may comprise laying up the woven reinforcing fibre ply, for example, by hand or by machine. For example, applying the woven reinforcing fibre ply may comprise wrapping the woven reinforcing fibre ply around the first portion of the fan track liner or fan track liner preform. Alternatively, applying the woven reinforcing fibre ply may comprise applying woven reinforcing fibre tape, for example, using an automated tape laying (ATL) process.

Applying the layer of reinforcing fibre felt may comprise laying up the layer of reinforcing fibre felt, for example, by hand or by machine. For example, applying the layer of reinforcing fibre felt may comprise wrapping a sheet of reinforcing fibre felt around the first portion of the fan track liner or fan track liner preform.

The method may comprise providing or producing a digital model for the fan track liner or the fan track liner preform. The digital model may be provided in the form of a Computer-aided Design (CAD) file such as an Additive Manufacturing File (AMF) or a stereolithography (STL) file. The method may comprise controlling the additive manufacturing apparatus using the digital model to deposit fibre-reinforced polymer material to form the first and second portions of the fan track liner or fan track liner preform.

The method may comprise forming the fan track liner around a tool. The method may comprise forming the fan track liner around a mandrel. The mandrel may be rotatable. The method may comprise forming the fan track liner or the fan track liner preform around a rotating mandrel. Alternatively, the method may comprise forming the fan track liner or the fan track liner preform on an inboard surface, for example, an adhesive-coated inboard surface, of a fan containment casing or a fan containment casing preform.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft. In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

The fan of a gas turbine as described and/or claimed herein may have any desired number of fan blades, for example 16, 18, 20, or 22 fan blades.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein. In particular: any feature described in relation to the first aspect may be applied mutatis mutandis, and except where mutually exclusive, to the twelfth aspect; any feature described in relation to the second aspect may be applied mutatis mutandis, and except where mutually exclusive, to the thirteenth aspect; and any feature described in relation to the third aspect may be applied mutatis mutandis, and except where mutually exclusive, to the fourteenth aspect.

DESCRIPTION OF THE DRAWINGS

Embodiments will now be described by way of example only, with reference to the Figures, in which.

DETAILED DESCRIPTION

Figure 1:
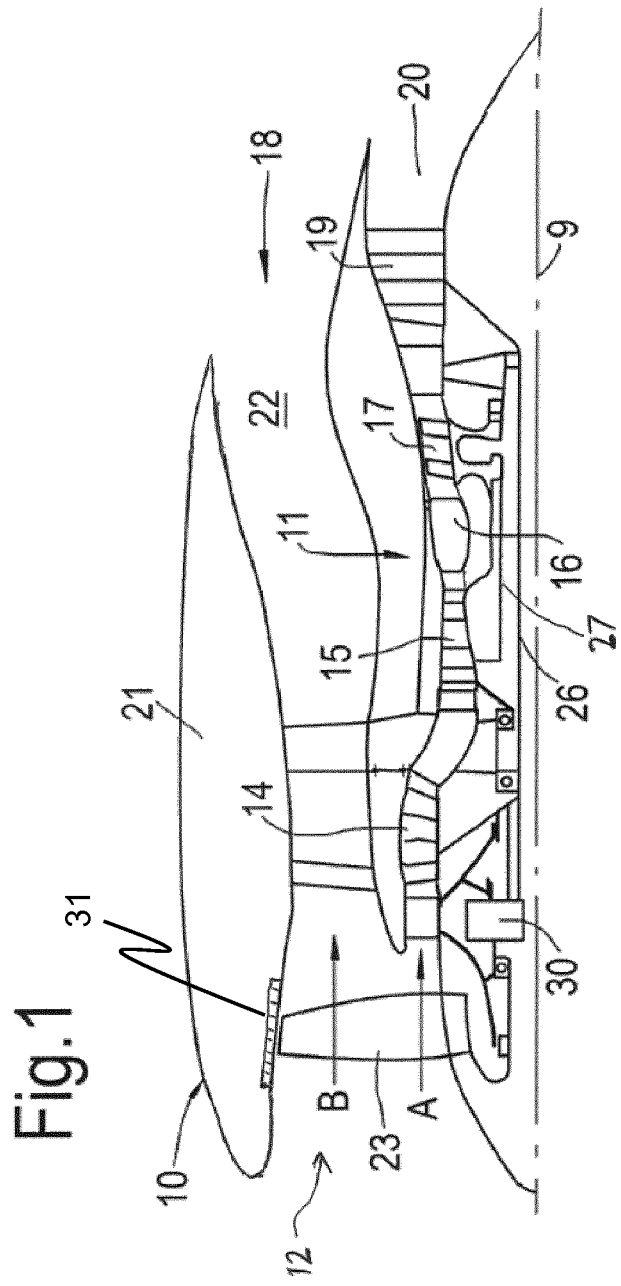
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. A fan containment arrangement 31 extends around the fan 23 inboard the nacelle 21.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
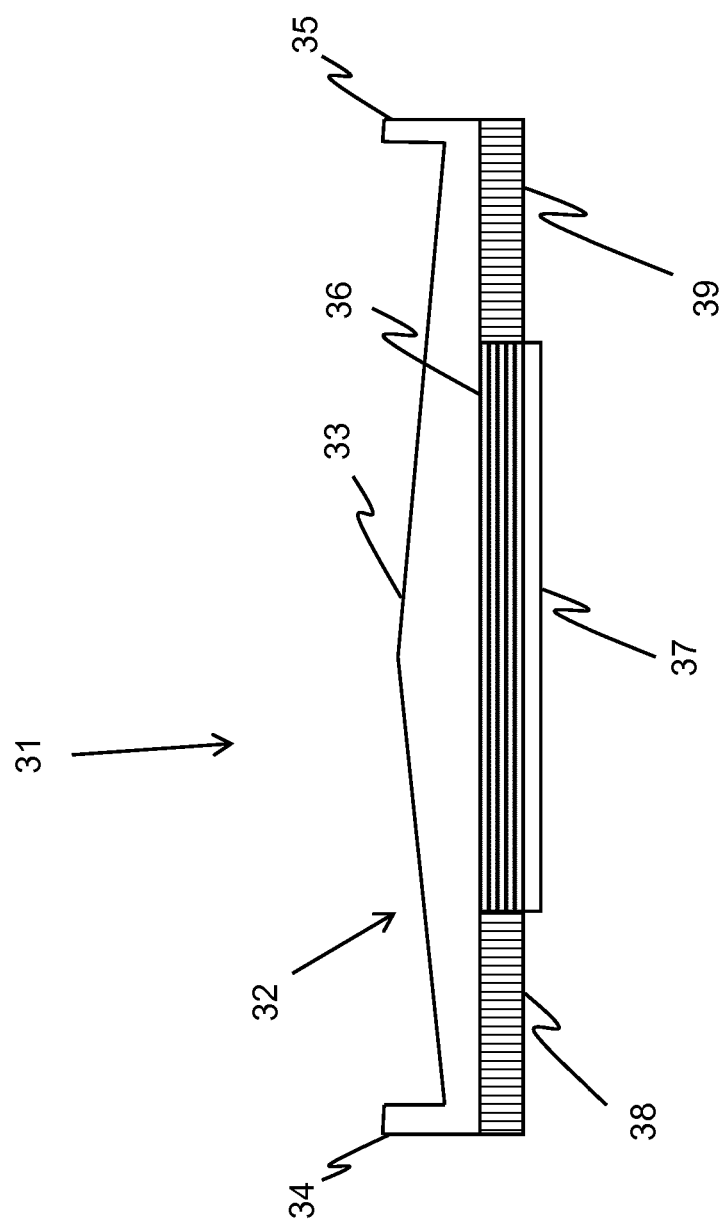
FIG. 2 is a sectional side view of a fan containment arrangement including a fan containment casing, a fan track liner and two acoustic liners.

The structure of the fan containment arrangement is illustrated in more detail in FIG. 2 which shows a sectional view of one portion of the fan containment arrangement 31.

The fan containment arrangement 31 includes a fan containment casing 32 which has middle portion (a barrel) 33 extending between a forward portion (i.e. forward flange) 34 and an aft portion (i.e. aft flange) 35. The fan containment casing 32 is formed predominantly from fibre-reinforced composite material and is located around the fan 23.

A fan impact liner 36 is adhered to an inboard surface of the middle portion 33 of the fan containment casing 32. The fan impact liner 36 has a predominantly cellular structure, discussed in more detail below, and is designed to absorb a substantial amount of energy on impact of a blade during a fan blade-off (FBO) event. The fan impact liner 36 incorporates an abradable layer 37. Forward and aft acoustic liners 38 and 39 are adhered to the fan containment casing 32 proximate the forward 34 and aft 35 portions respectively. The fan containment casing 32 acts as a rigid structural support for the fan impact liner 36, abradable layer 37, and acoustic liners 38 and 39.

Figure 3:
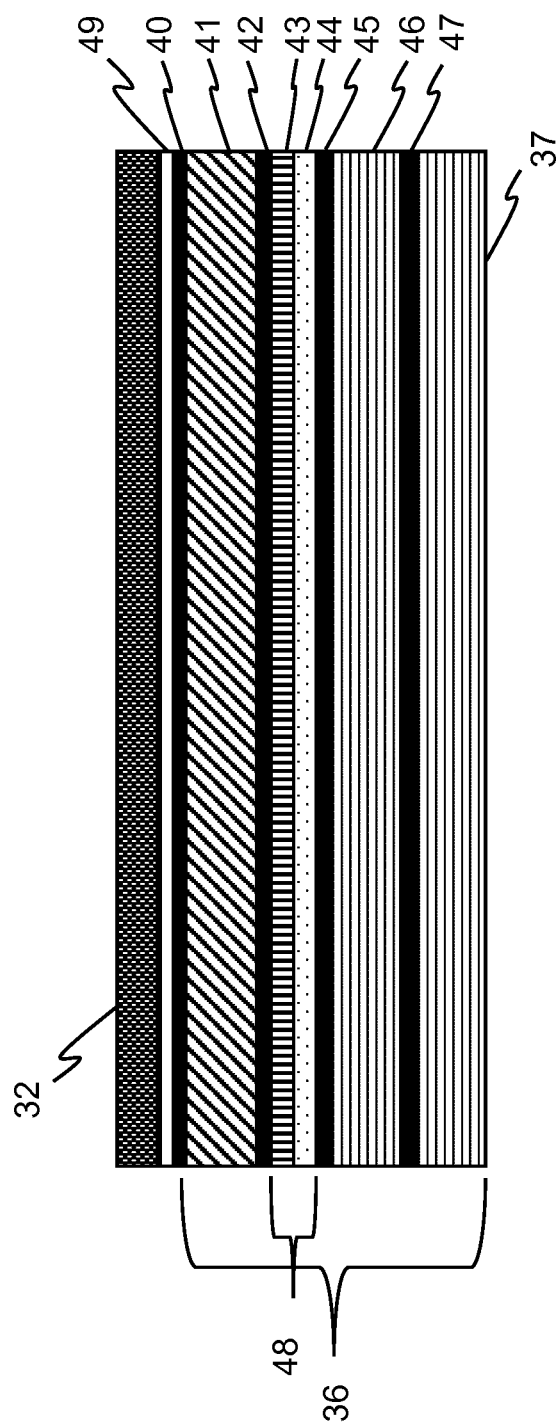
FIG. 3 is a schematic sectional view through a fan track liner and a portion of a fan containment casing.

The structure of the fan impact liner 36 and the abradable layer 37 is shown in more detail in FIG. 3. The fan impact liner 36 consists of the following structural layers: an outboard face-sheet sub-laminate 40; an optimised-angle low-density honeycomb structure 41; a first septum layer sub-laminate 42; a woven reinforcing fibre ply 43; a layer of reinforcing fibre felt 44; a second septum layer sub-laminate 45; a high-density honeycomb structure 46; an inboard face-sheet sub-laminate 47; and the abradable layer 37 which has a honeycomb structure.

Each of the outboard face-sheet sub-laminate 40, the optimised-angle low-density honeycomb structure 41, the first septum layer sub-laminate 42, the second septum layer sub-laminate 45, the high-density honeycomb structure 46, the inboard face-sheet sub-laminate 47, and the abradable layer 37 are formed from the same fibre-reinforced polymer material, which in this example is carbon fibre reinforced polymer (CFRP) material consisting of carbon fibres suspended in an epoxy resin. However, these layers could also be formed from other suitable fibre-reinforced polymer materials which incorporate reinforcing fibres made of, for example, aramids (such as poly-paraphenylene terephthalamide (Kevlar®) or p-phenylene terephthalamide (Twaron®)), thermoset liquid-crystalline polyoxazole (such as poly(p-phenylene-2,6-benzobisoxazole) (PBO or Zylon®)), or ultra-high-molecular-weight polyethylene (UHMWPE), and polymer matrix materials such as polyester, vinyl ester, polyamide (e.g. nylon), polylactide, polycarbonate, or acrylonitrile butadiene styrene (ABS).

The outboard face-sheet sub-laminate 40, the first septum layer sub-laminate 42, the second septum layer sub-laminate 45 and the inboard face-sheet sub-laminate 47 consist of solid layers of the CFRP material in which reinforcing fibres are generally aligned parallel to the engine axis 9 or circumferentially around the fan track liner. The optimised-angle low-density honeycomb structure 41, the high-density honeycomb structure 46 and the abradable layer 37 consist of CFRP material arranged to form the cell walls of honeycomb structures. The cells of the honeycomb structures are air-filled. The optimised-angle low-density honeycomb structure 41 should have a cell size of about 7 mm. The high-density honeycomb structure 46 should have a cell size of about 3 mm. The abradable layer 37 should have a cell size of about 5 mm. The cell walls of the optimised-angle low-density honeycomb structure 41 are angled to align predominantly with the predicted trajectory of a fan blade during an FBO event.

Each of the outboard face-sheet sub-laminate 40, the optimised-angle low-density honeycomb structure 41, the first septum layer sub-laminate 42, the second septum layer sub-laminate 45, the high-density honeycomb structure 46, the inboard face-sheet sub-laminate 47 and the abradable layer 37 are integrally formed with one another, such that the CFRP material extends continuously between all said layers. Although the first septum layer sub-laminate 42 and the second septum later sub-laminate 45 are shown in FIG. 3 as being spaced apart from one another by the woven reinforcing fibre ply 43 and the layer of reinforcing fibre felt 44, these woven and felt layers do not extend along the entire axial length of the fan track liner 36 and are in fact completely encapsulated by CFRP material which extends between the first septum layer sub-laminate 42 and the second septum layer sub-laminate 45 at each axial end of the fan track liner 36. In other examples, the woven and felt layers may comprise a plurality of discrete and angularly spaced layer elements to permit CRFP material to extend between the first septum layer sub-laminate 42 and the second septum layer sub-laminate 45 at angular locations between the layer elements, and the respective woven and felt layers may extend the full axial length of the fan track liner 36.

The woven reinforcing fibre ply 43 and the layer of reinforcing fibre felt 44 together form a ballistic barrier layer 48. In this embodiment, both the woven reinforcing fibre ply 43 and the reinforcing fibre felt 44 are formed from reinforcing fibres of poly-paraphenylene terephthalamide (otherwise known as Kevlar®). However, the woven ply and felt may both be formed from reinforcing fibres of carbon, aramids, UHMWPE, PBO, or other suitable high-strength materials. The woven fibre ply 43 may take any suitable fibre weaves known in the art, including plain, twill, satin, basket, leno or mock leno weaves.

The fan track liner 36 is bonded to an inboard surface of the fan containment casing 32 by a layer of epoxy-based adhesive 49. The fan track liner 36 extends angularly completely around the engine (i.e. completely around the inboard circumference of the fan containment casing 32) in the region proximate the fan.

The structure of the fan track liner 36 is designed to absorb a significant amount of energy from an impacting fan blade during an FBO event. In particular, cellular structures like honeycomb are typically able to absorb the energy of an impact by mechanical deformation through three regimes: an initial elastic deformation regime; a subsequent cell collapse regime, in which cell walls buckle and collapse due to plastic deformation; and finally a densification regime in which adjacent cell walls are pressed into one another and the relative density of the cellular material increases significantly. Accordingly, on impact of a fan blade during an FBO event, the various layers of honeycomb material in the fan track liner generally undergo substantial deformation, absorbing energy and slowing down the impacting blade.

In addition, the ballistic barrier layer 48 further improves the impact resistance of the fan track liner 36. An impacting projectile reaching the ballistic barrier first comes into contact with the layer of felt 44 which absorbs energy as the felt fibres are compressed and which moulds itself around the projectile, thereby softening any sharp projectile edges. By slowing down and blanketing the projectile, the layer of felt reduces the likelihood of the projectile being able to pierce through the woven ply 43, which provides the ballistic barrier layer 48 with increased strength. Together, both layers of the ballistic barrier further reduce the likelihood of an impacting projectile penetrating the fan containment casing 32.

Because the fan track liner is formed predominantly from the same fibre-reinforced polymer material, the coefficient of thermal expansion is effectively uniform throughout each of layers 37, 40, 41, 42, 45 and 46. Consequently, the fan track liner typically expands or contracts uniformly in response to changes in temperature. This reduces the likelihood of structural deformations, such as warping or interfacial separation, occurring in response to changes in temperature, particularly during manufacture of the fan track liner or during bonding of the fan track liner to the fan containment casing, as explained in more detail below.

The fan track liner is manufactured principally using the additive manufacturing process known as fused deposition modelling (FDM) or, equivalently, fused filament fabrication (FFF). FDM involves the feeding of one or more filaments of input material into a heated extruder head which melts some or all of the input material and deposits molten material onto a substrate. The rate of deposition and the movement of the extruder head can be controlled accurately using a computer provided with a digital design model, allowing complex three-dimensional structures to be build up layer by layer.

It is now possible to deposit fibre-reinforced polymer materials, such as CFRP, using FDM apparatus. In some cases, fibre-reinforced polymer materials may be deposited by using filaments of compounded fibre-reinforced polymer material as inputs. In other cases, fibre-reinforced polymer materials may be deposited by using separate polymer and reinforcing fibre filaments as inputs to a single extruder head. It is possible to deposit both continuous-fibre and discontinuous-fibre reinforced polymer materials using FDM methods known in the art.

Figure 4:
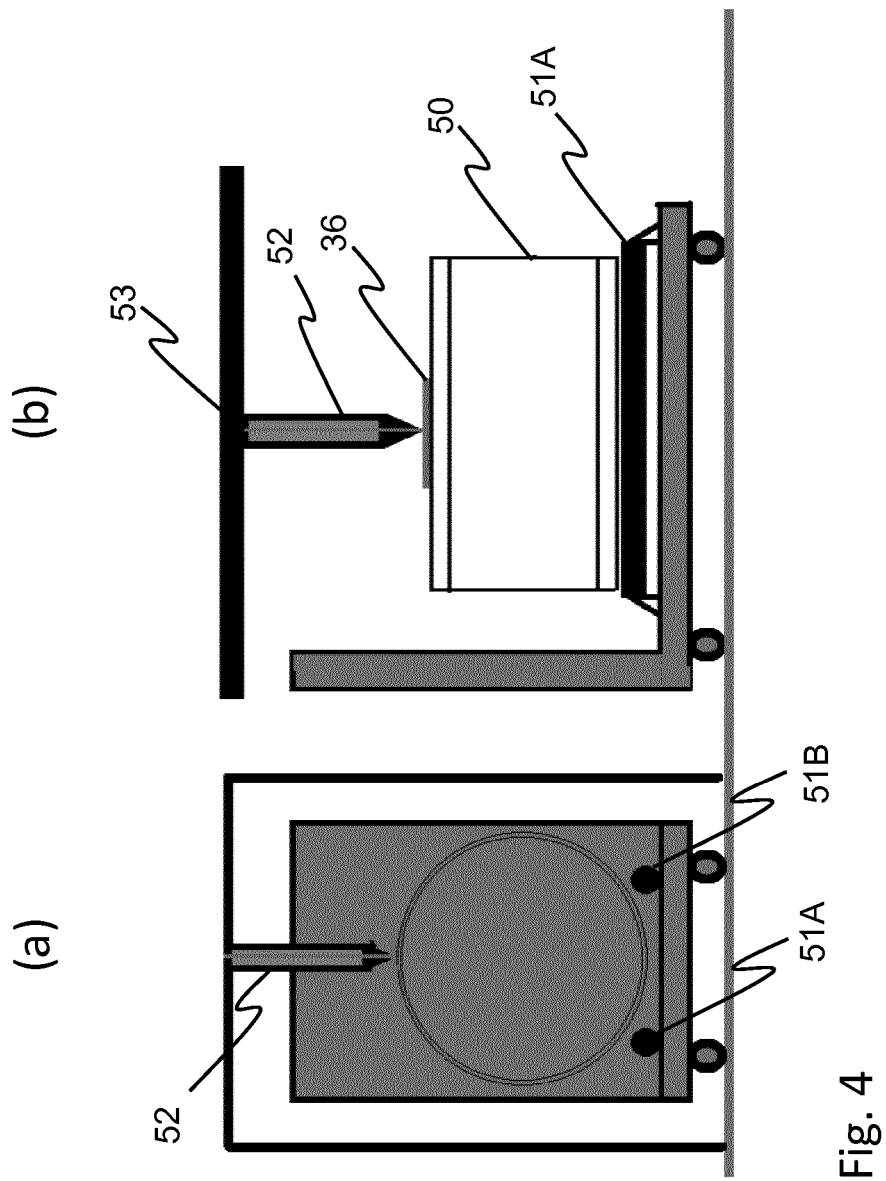
FIG. 4 contains two sectional side views (a) and (b) along two mutually orthogonal directions through additive manufacturing apparatus depositing a fan track liner on a mandrel.

One method for manufacturing a fan track liner is illustrated in FIG. 4 in which fibre-reinforced composite material is deposited onto a cylindrical mandrel 50. The mandrel 50 is rotated about its longitudinal axis by rollers 51A and 51B. A movable FDM extruder head 52 fed with fibre-reinforced polymer input materials is mounted on a gantry 53 above the mandrel. The FDM extruder head can be controlled by a computer (not shown) to deposit fibre-reinforced polymer material onto the rotating mandrel 50 to sequentially build up the various layers 37, 47, 46, 45, 42, 41 and 40 of the fan track liner around the circumference of the mandrel. Between deposition of layers 45 and 42, the FDM deposition process may be paused and the ballistic barrier layer may be formed by wrapping a layer of Kevlar® felt and a Kevlar® woven ply around the layers already deposited onto the mandrel. FDM deposition of the remaining layers 42, 41 and 40 may then continue in order to encapsulate the felt layer and woven ply within the additively manufactured fan track liner structure.

The FDM process may use a thermoplastic polymer as an input material, in which case the process of manufacturing the fan track liner does not require a curing step and the structure formed by the FDM process may be a complete fan track liner. However, the FDM apparatus may be provided with inputs including a thermosetting polymer, such as an epoxy resin. In this case, the structure formed by the FDM process may be a fan track liner preform which must be cured in order to produce the final fan track liner. Curing the fan track liner preform typically involves heating the preform to the curing temperature of the matrix material and/or applying pressure to the preform. Because the majority of the layers of the fan track liner preform are printed using the same material, structural distortions due to thermal expansion or contraction during curing are reduced, particularly in comparison to known fan track liners which are typically manufactured by the co-curing of multiple layers of different materials which exhibits different thermal responses. Because the fan track liner typically expands or contracts relatively uniformly in response to changes in temperatures, any remaining thermally-induced structural deformations are also relatively simple to model and therefore to take into account when manufacturing the entire fan containment arrangement.

It is also possible to form the fan containment casing 32 around the same mandrel 50 as is used to form the fan track liner 36. The fan containment casing may be manufactured using standard composite manufacturing techniques well-known in the field. For example, the fan containment casing may be manufactured by first laying up a preform for the fan containment casing around the fan track liner or fan track liner preform deposited on the mandrel, and subsequently curing the fan containment casing preform. Laying up the fan containment casing preform may involve repeatedly applying layers of, for example, carbon-fibre plies to the mandrel. Carbon-fibre plies may be applied in the form of carbon-fibre tapes, particularly carbon-fibre tapes pre-impregnated with uncured matrix material such as an uncured resin. Alternatively, uncured matrix material may be injected into the fan containment casing preform after laying up has been completed. The fan containment casing preform is then typically cured by application of heat and/or pressure.

It is possible to cure both the fan track liner preform and the fan containment casing preform together, thereby reducing the number of curing steps required to form a fan containment arrangement. Alternatively, it is possible to first cure the fan track liner preform on the mandrel and then subsequently to lay up the fan containment casing preform around the cured fan track liner and cure the fan containment casing preform.

Figure 5:
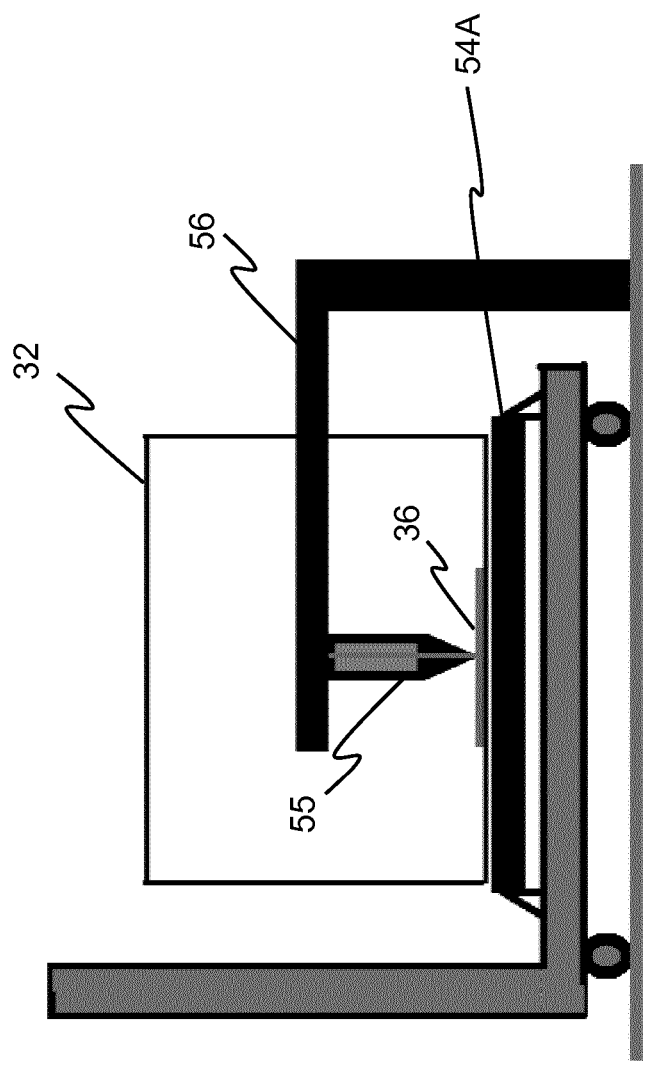
FIG. 5 is a sectional side view through additive manufacturing apparatus depositing a fan track liner inside a fan containment casing.

An alternative method for forming the fan track liner 36 is illustrated in FIG. 5 in which fibre-reinforced composite material is deposited directly onto the interior of a fan containment casing 32 which has already been cured. In this method, the fan containment casing is rotated about its longitudinal axis by rollers 54A and 54B. A movable FDM extruder head 55 fed with fibre-reinforced polymer input materials is mounted on a movable arm 56 which is inserted into the hollow fan containment casing. The movable arm and FDM extruder head are controlled by a computer (not shown) to deposit fibre-reinforced polymer material onto the inboard surface of the fan containment casing 32 to sequentially build up the various layers 40, 41, 42, 45, 46, 47 and 37 of the fan track liner around the inboard circumference of the fan containment casing. Between deposition of layers 42 and 45, the FDM deposition process may be paused and the ballistic barrier layer may be formed by applying a Kevlar® woven ply and a layer of Kevlar® felt to the layers already deposited onto the interior of the fan containment casing. FDM deposition of the remaining layers 45, 46, 47 and 37 may then continue in order to encapsulate the woven ply and the felt layer within the additively manufactured fan track liner structure.

Where a thermosetting polymer is used as the matrix material, the deposited fan track liner preform may be cured inside the fan containment case by applying heat and/or pressure. Because the majority of the layers of the fan track liner preform are printed using the same material, structural distortions due to thermal expansion or contraction during curing are again reduced.

The skilled person will appreciate that the same FDM processes may also be used to deposit fibre-reinforced polymer material to form the acoustic liners 38 and 39, either separately from or integrated with the fan impact liner 36.

Figure 6:
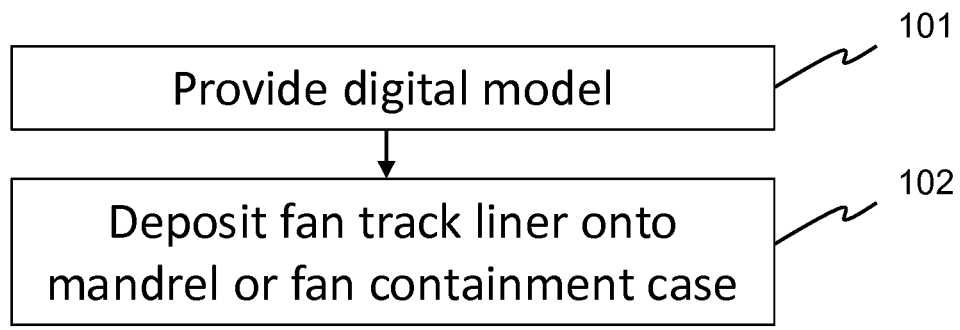
FIG. 6 is a flow diagram of one embodiment of a method for manufacturing a fan track liner.

FIG. 6 is a flow diagram of a method of manufacturing a fan track liner, which illustrates steps described above with reference to FIGS. 4 and 5. In block 101, FDM apparatus is provided with a digital model for the fan track liner, for example, in the form of an AMF or STL file. In block 102, the FDM apparatus is used to deposit a fibre-reinforced polymer material onto either a rotating mandrel or the interior surface of a fan containment case, thereby forming the fan track liner according to the digital model.

Figure 7:
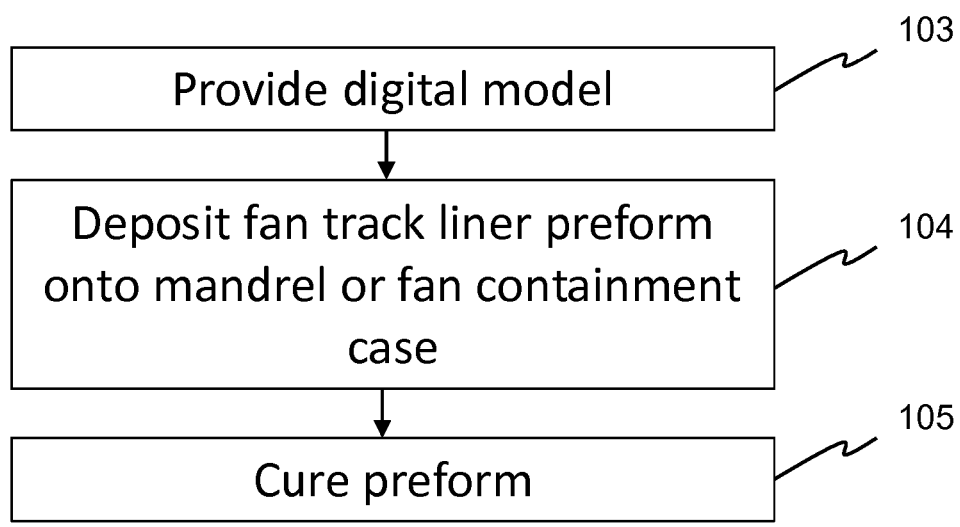
FIG. 7 is a flow diagram of another embodiment of a method for manufacturing a fan track liner.

FIG. 7 is a flow diagram of an alternative method of manufacturing a fan track liner, which illustrates steps described above with reference to FIGS. 4 and 5. In block 103, FDM apparatus is provided with a digital model for a fan track liner preform, for example, in the form of an AMF or STL file. In block 104, the FDM apparatus is used to deposit a thermosetting fibre-reinforced polymer material onto either a rotating mandrel or the interior surface of a fan containment case, thereby forming a fan track liner preform according to the digital model. In block 105, the fan track liner preform is cured, for example by application of heat and/or pressure, to form a fan track liner.

Figure 8:
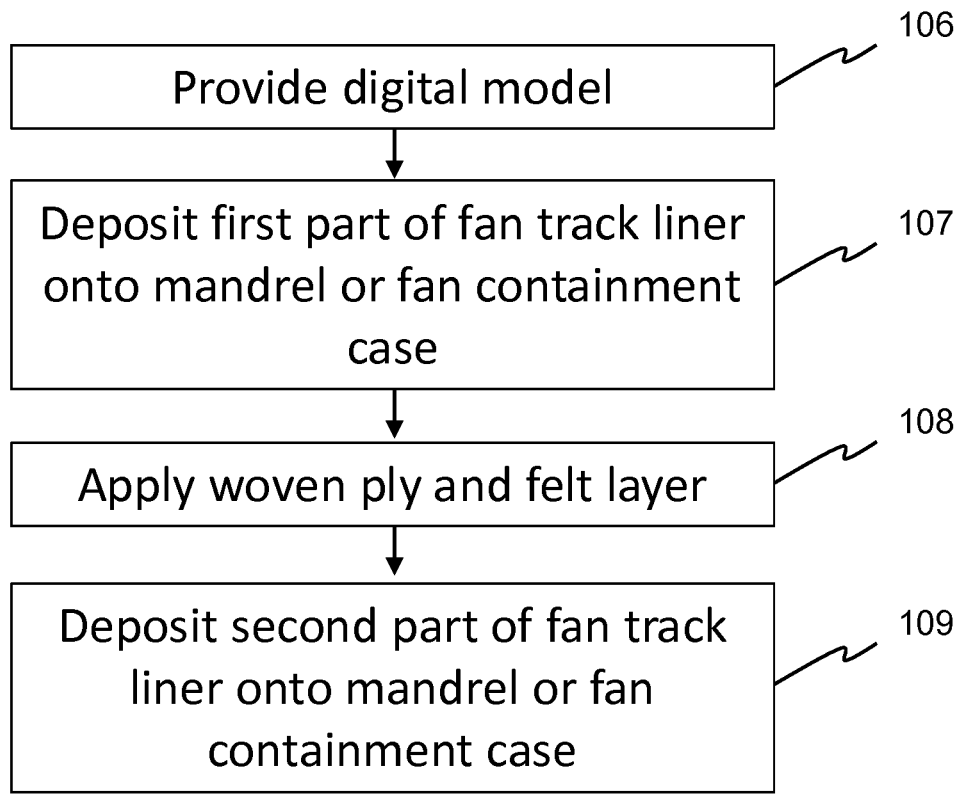
FIG. 8 is a flow diagram of another embodiment of a method for manufacturing a fan track liner.

FIG. 8 is a flow diagram of a further alternative method of manufacturing a fan track liner, which illustrates steps described above with reference to FIGS. 4 and 5. In block 106, FDM apparatus is provided with a digital model for a fan track liner, for example, in the form of an AMF or STL file. In block 107, the FDM apparatus is used to deposit fibre-reinforced polymer material onto either a rotating mandrel or the interior surface of a fan containment case, thereby forming a first portion of the fan track liner according to the digital model. In block 108, a woven reinforcing fibre ply and a layer of reinforcing fibre felt are applied to the first portion of the fan track liner. The order of application of the woven reinforcing fibre ply and layer of reinforcing fibre felt may be varied, dependent on whether the fan track liner is deposited onto a rotating mandrel or the interior surface of a fan containment case, such that the layer of reinforcing fibre felt is inboard of the woven reinforcing fibre ply in the completed fan track liner. In block 109, the FDM apparatus is used to deposit fibre-reinforced polymer material onto the layers already formed on the rotating mandrel or fan containment case, thereby forming a second portion of the fan track liner and encapsulating the woven ply and felt layer between the first and second portions of the fan track liner.

Figure 9:
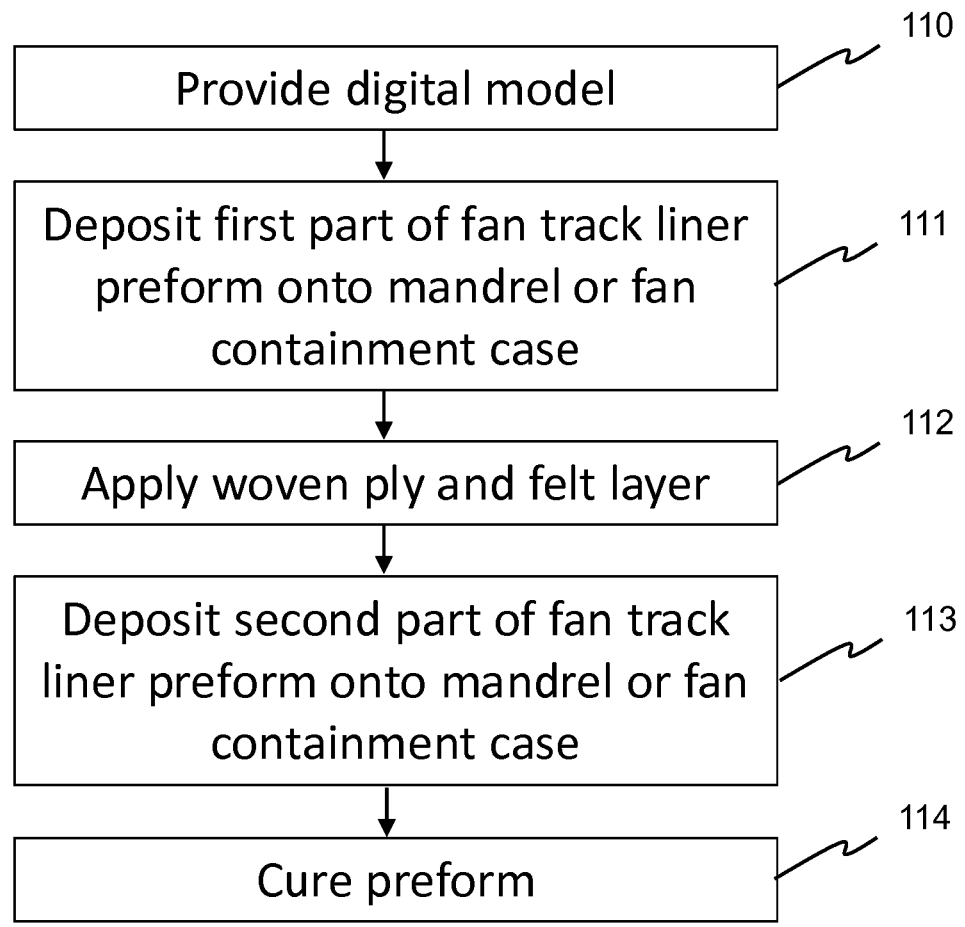
FIG. 9 is a flow diagram of another embodiment of a method for manufacturing a fan track liner.

FIG. 9 is a flow diagram of a further alternative method of manufacturing a fan track liner, which illustrates steps described above with reference to FIGS. 4 and 5. In block 110, FDM apparatus is provided with a digital model for a fan track liner preform, for example, in the form of an AMF or STL file. In block 111, the FDM apparatus is used to deposit thermosetting fibre-reinforced polymer material onto either a rotating mandrel or the interior surface of a fan containment case, thereby forming a first portion of the fan track liner preform according to the digital model. In block 112, a woven reinforcing fibre ply and a layer of reinforcing fibre felt are applied to the first portion of the fan track liner preform. The order of application of the woven reinforcing fibre ply and layer of reinforcing fibre felt may be varied, dependent on whether the fan track liner preform is deposited onto a rotating mandrel or the interior surface of a fan containment case, such that the layer of reinforcing fibre felt is inboard of the woven reinforcing fibre ply in the completed fan track liner. In block 113, the FDM apparatus is used to deposit thermosetting fibre-reinforced polymer material onto the layers already formed on the rotating mandrel or fan containment case, thereby forming a second portion of the fan track liner preform and encapsulating the woven ply and felt layer between the first and second portions of the fan track liner preform. In block 114, the fan track liner preform is cured, for example by application of heat and/or pressure, to form a fan track liner.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the invention extends to the subject-matter set out in the following numbered paragraphs:

1. A fan track liner for a fan containment arrangement for a gas turbine engine, the fan track liner comprising a cellular impact structure and a supporting sub-laminate integrally formed with each other from a fibre-reinforced polymer material.
2. A fan track liner according to paragraph 1, wherein the cellular impact structure is a honeycomb structure.
3. A fan track liner according to paragraph 1 or paragraph 2 further comprising a ballistic barrier comprising a woven reinforcing fibre ply and a layer of reinforcing fibre felt.
4. A fan track liner according to any preceding paragraph, wherein the cellular impact structure and the supporting sub-laminate are integrally formed with each other by additive manufacture.
5. A fan track liner according to any preceding paragraph, wherein the fibre-reinforced polymer material comprises reinforcing fibres made from one or more of the following: carbon, aramid polymers, ultrahigh molecular weight polyethylene, PBO.
6. A fan track liner according to any preceding paragraph comprising two cellular impact structures separated from one another by a septum layer formed by a supporting sub-laminate, and, optionally, wherein the two cellular impact structures have different cell densities.
7. A fan track liner according to any preceding paragraph comprising two supporting face-sheet sub-laminates, one of said supporting face-sheet sub-laminates forming an inboard face of the fan track liner and the other of said supporting face-sheet sub-laminates forming an outboard face of the fan track liner, thereby forming a sandwich structure in which the cellular impact structure is located between the two supporting face-sheet sub-laminates.
8. A fan containment arrangement for a gas turbine engine, the fan containment arrangement comprising a fan containment casing and a fan track liner according to any preceding paragraph.
9. A method of manufacturing a fan track liner or a fan track liner preform for a fan containment arrangement for a gas turbine engine, the method comprising: depositing, by additive manufacturing apparatus, fibre-reinforced polymer material to form a cellular impact structure and a supporting sub-laminate integrated with one another.
10. A method according to paragraph 9 further comprising: providing or producing a digital model for the fan track liner or the fan track liner preform; and controlling the additive manufacturing apparatus using the digital model to deposit fibre-reinforced polymer material to form the cellular impact structure and the supporting sub-laminate.
11. A method according to paragraph 9 or paragraph 10 further comprising depositing the fibre-reinforced polymer material onto a rotating mandrel.
12. A method according to paragraph 11 further comprising: laying up a fan containment casing preform around the fan track liner or fan track liner preform formed on the rotating mandrel; and curing the fan containment casing preform and optionally, where present, curing the fan track liner preform.
13. A method according to paragraph 9 or 10 further comprising: depositing the fibre-reinforced polymer material onto an inboard surface of a fan containment casing or a fan containment casing preform, for example, an adhesive-coated inboard surface of a fan containment casing or a fan containment preform; and optionally, where present, curing the fan track liner preform and/or the fan containment casing preform.
14. A digital design model for the fan track liner according to any of paragraphs 1 to 7.
15. A computer program comprising instructions to cause an additive manufacturing apparatus to carry out the method according to any of paragraphs 9 to 13 and/or to produce a fan track liner according to any of paragraphs 1 to 7.
16. A non-transitory computer-readable medium storing the digital design model according to paragraph 14 and/or the computer program according to paragraph 15.
17. A data carrier signal carrying the digital design model according to paragraph 14 and/or the computer program according to paragraph 15.
18. A fan track liner for a fan containment arrangement for a gas turbine engine, the fan track liner comprising an embedded ballistic barrier comprising a woven reinforcing fibre ply and a layer of reinforcing fibre felt, wherein, optionally, the woven reinforcing fibre ply is provided outboard of the layer of reinforcing fibre felt.
19. A fan track liner according to paragraph 18 further comprising a cellular impact structure.
20. A fan track liner according to paragraph 19 comprising two cellular impact structures separated from one another by a septum layer which comprises the ballistic barrier.
21. A fan track liner according to any of paragraphs 18 to 20, wherein the woven reinforcing fibre ply and the layer of reinforcing fibre felt each comprise reinforcing fibres made from one or more of the following: carbon, aramid polymers, ultrahigh molecular weight polyethylene, PBO.
22. A fan containment arrangement for a gas turbine engine, the fan containment arrangement comprising a fan containment casing and a fan track liner according to any of paragraphs 18 to 21.
23. A method of manufacturing a fan track liner for a fan containment arrangement for a gas turbine engine, the method comprising: depositing, for example by additive manufacturing apparatus, fibre-reinforced polymer material to form a first portion of the fan track liner or a fan track liner preform; forming a ballistic barrier layer on the first portion of the fan track liner or the fan track liner preform by applying a woven reinforcing fibre ply and a layer of reinforcing fibre felt; and depositing, for example by additive manufacturing apparatus, fibre-reinforced polymer material onto and around the ballistic barrier layer to form a second portion of the fan track liner or the fan track liner preform, thereby encapsulating the ballistic barrier layer between the first and second portions of the fan track liner or fan track liner preform; and, optionally, curing the fan track liner preform.

What is claimed is:

1. An apparatus comprising:
    a fan track liner for a fan containment arrangement for a gas turbine engine, the fan track liner comprising a cellular impact structure and a supporting sub-laminate integrally formed with each other from a fibre-reinforced polymer material,
    wherein the fan track liner further comprises a ballistic barrier comprising a woven reinforcing fibre ply and a layer of reinforcing fibre felt.

2. The apparatus according to claim 1, wherein the cellular impact structure is a honeycomb structure.

3. The apparatus according to claim 1, wherein the cellular impact structure and the supporting sub-laminate are integrally formed with each other by additive manufacture.

4. The apparatus according to claim 1, wherein the fibre-reinforced polymer material comprises reinforcing fibres made from one or more materials selected from a group consisting of: carbon, aramid polymers, ultrahigh molecular weight polyethylene, and polybenzoxazoles.

5. The apparatus according to claim 1, wherein the cellular impact structure is a first cellular impact structure, the fan track liner further comprises a second cellular impact structure integrally formed with the supporting sub-laminate, and the first and second cellular impact structures are separated from one another by a septum layer formed by the supporting sub-laminate.

6. The apparatus according to claim 5, wherein the first and second cellular impact structures have different cell densities.

7. The apparatus according to claim 1, wherein the supporting sub-laminate is a first supporting face-sheet sub-laminate and the fan track liner further comprises a second supporting face-sheet sub-laminate, one of said first and second supporting face-sheet sub-laminates forming an inboard face of the fan track liner and the other of said first and second supporting face-sheet sub-laminates forming an outboard face of the fan track liner, thereby forming a sandwich structure in which the cellular impact structure is located between the first and second supporting face-sheet sub-laminates.

8. The apparatus according to claim 1, further comprising a fan containment casing, the fan track liner and the fan containment casing providing a fan containment arrangement.

9. A method of manufacturing a fan track liner for a fan containment arrangement for a gas turbine engine, the method comprising:
    depositing fibre-reinforced polymer material to form a first portion of the fan track liner or a fan track liner preform;
    forming a ballistic barrier layer on the first portion of the fan track liner or the fan track liner preform by applying a woven reinforcing fibre ply and a layer of reinforcing fibre felt; and
    depositing fibre-reinforced polymer material onto and around the ballistic barrier layer to form a second portion of the fan track liner or the fan track liner preform, thereby encapsulating the ballistic barrier layer between the first and second portions of the fan track liner or the fan track liner preform.

10. The method according to claim 9, wherein the fibre-reinforced polymer material is deposited to form the first portion of the fan track liner or the fan track liner preform by an additive manufacturing apparatus.

11. The method according to claim 9, wherein the fibre-reinforced polymer material is deposited onto and around the ballistic barrier layer to form the second portion of the fan track liner or the fan track liner preform by an additive manufacturing apparatus.

12. The method according to claim 9, further comprising, where present, curing the fan track liner preform.

* * * * *